(12) United States Patent
Kitahara et al.

(10) Patent No.: US 8,613,544 B2
(45) Date of Patent: Dec. 24, 2013

(54) BAND, WRISTWATCH WITH THE BAND AND METHOD OF MAKING THE BAND

(75) Inventors: Masaaki Kitahara, Nishitama-gun (JP);
Shinichi Tanaka, Tsurugashima (JP);
Kazumi Nakahara, Yoro-gun (JP); Yoji Honda, Anpachi-gun (JP); Katsuyuki Aizawa, Anpachi-gun (JP)

(73) Assignee: Casio Computer Co., Ltd., Tokyo (JP)

( * ) Notice: Subject to any disclaimer, the term of this patent is extended or adjusted under 35 U.S.C. 154(b) by 673 days.

(21) Appl. No.: 12/873,590

(22) Filed: Sep. 1, 2010

(65) Prior Publication Data
US 2011/0051569 A1    Mar. 3, 2011

(30) Foreign Application Priority Data

Sep. 1, 2009  (JP) ................................ 2009-201439
Aug. 13, 2010  (JP) ................................ 2010-181370

(51) Int. Cl.
*G04B 37/00*    (2006.01)
(52) U.S. Cl.
USPC .......................................................... 368/282
(58) Field of Classification Search
USPC ............................ 368/280–282; 224/164–180
See application file for complete search history.

(56) References Cited

U.S. PATENT DOCUMENTS

| | | | | |
|---|---|---|---|---|
| 3,362,595 | A * | 1/1968 | Herzog | 224/178 |
| 3,578,208 | A * | 5/1971 | Herzog | 224/178 |
| 5,212,966 | A * | 5/1993 | Minami | 63/3 |
| 7,275,667 | B2 * | 10/2007 | Bertucci | 224/178 |
| 2009/0175135 | A1 * | 7/2009 | Moore et al. | 368/282 |

FOREIGN PATENT DOCUMENTS

| | | | | |
|---|---|---|---|---|
| DE | 29801546 | U1 * | 4/1998 | .............. B32B 15/08 |
| JP | 58-114109 | U | 8/1983 | |
| JP | 59-108410 | U | 7/1984 | |
| JP | 62-60511 | A | 3/1987 | |
| JP | 7-96808 | A | 4/1995 | |
| JP | 7-136008 | A | 5/1995 | |
| JP | 8-187115 | A | 7/1996 | |
| JP | 2000-160475 | A | 6/2000 | |
| JP | 2001-024343 | A | 1/2001 | |
| JP | 2005-177007 | A | 7/2005 | |
| JP | 2006-271610 | A | 10/2006 | |

OTHER PUBLICATIONS

Japanese Office Action dated Oct. 11, 2011 (and English translation thereof) in counterpart Japanese Application No. 2010-181370.
Japanese Office Action dated Jan. 17, 2012 (and English translation thereof) in counterpart Japanese Application No. 2010-181370.

* cited by examiner

*Primary Examiner* — Edwin A. Leon
(74) *Attorney, Agent, or Firm* — Holtz, Holtz, Goodman & Chick, PC (57) ABSTRACT

A band, a wristwatch with the band and a method of making the band are described. The band includes a strip-like body with a series of holes provided therein along a length thereof for adjusting an effective length thereof. The body includes a band-shaped support layer of woven or knit fabric of bundles of one or more kinds of fibers, the fibers being selected from a group including carbon fibers, glass fibers, aramid fibers and boron fibers. The body also includes a first resin layer adhering closely to one surface of the support layer, and a second resin layer adhering closely to the other surface of the support layer. The fibers of the support layer extend at a predetermined angle to longitudinal and transverse directions of the body.

6 Claims, 10 Drawing Sheets

BAND, WRISTWATCH WITH THE BAND AND METHOD OF MAKING THE BAND

CROSS-REFERENCE TO RELATED APPLICATIONS

This application is based upon and claims the benefit of priority from prior Japanese Patent Applications No. 2009-201439, filed Sep. 1, 2009; and No. 2010-181370, filed Aug. 13, 2010, the entire contents of both of which are incorporated herein by reference.

BACKGROUND OF THE INVENTION

1. Field of the Invention

The present invention relates to a band, a wristwatch with the band and a method of making the band.

2. Description of the Related Art

Recently, wristwatch bands and band retaining loops made of a resin material are used. These bands and loops are liable to be broken when used for a long time because the resin materials are likely to absorb moisture and mold and their function is degraded. In order to conquer this problem, resin materials usable for a long time have been investigated and selected. However, only selection of such materials would limit improvements in the band strength.

Wristwatch bands have been developed which include a resin band and a carbon fiber texture layer inserted as a reinforcing material in the band. For example, Japanese Patent Application KOKAI publication No. 7-136008 discloses a wristwatch band whose whole or part is composed of a top transparent coat layer, a carbon fiber fabric layer attached closely to the underside of the top coat, and a band core layer closely attached to the underside of the carbon fiber fabric.

The wristwatch band disclosed in the Japanese Patent Application KOKAI publication No. 7-136008 shows an increased strength of a series of holes in the band in each of which is engaged a buckle clasp for adjusting the effective length of the band. However, no consideration is given to reinforcement of an end of the band which is connected to the case or, more particularly, of the peripheral part of a through hole extending through the width of the band end portion through which hole a spring bar is inserted to connect the band end portion to the case over the spring bar. Thus, the problem that the band is likely to be broken at the through hole in the band end portion has not been solved.

In addition, there is another problem that the top coat layer is likely to be separated from the band during its use due to partial breakage or twisting of the band.

BRIEF SUMMARY OF THE INVENTION

It is therefore an object of the present invention to provide a band of greatly increased strength where neither breakage of the band nor separation of the component layer from the band due to twisting of the band occurs during its use. The present invention also provides a wristwatch using the band and a method of making the band.

According to one aspect of the present invention, there is provided a band comprising a band body with a series of holes provided therein along a length thereof for adjusting an effective length thereof. The band body comprises: a band-shaped support layer of woven or knit fabric of bundles of one or more kinds of fibers selected from a group including carbon fibers, glass fibers, aramid fibers and boron fibers; a first resin layer adhered closely to one surface of the support layer; and a second resin layer adhered closely to the other side of the support layer. The fibers of the support layer extend at a predetermined angle to longitudinal and transverse directions of the band body.

According to another aspect of the present invention, there is provided another band comprising a band body with a series of holes provided therein along a length thereof for adjusting an effective length thereof. The band body comprises: a band-shaped support layer comprising a fiber layer of woven or knit fabric of bundles of one or more kinds of fibers selected from a group including carbon fibers, glass fibers and aramid fibers, and a metal layer of metal particles including aluminum alloy or nickel alloy and deposited on the woven or knit fabric; a first resin layer adhered closely to one surface of the support layer; and a second resin layer adhered closely to the other side of the support layer. The fibers of the support layer extend at a predetermined angle to longitudinal and transverse directions of the band body.

According to the present invention, the predetermined angle is in a range of 15-75 degrees.

According to the present invention, the predetermined angle is 45 degrees.

According to the present invention, the support layer has a loop at one end thereof, the loop forming a spring-bar hole to be connected to an object to which the band is connected, a width of the one end of the support layer is somewhat narrower than a width of the band body, the first resin layer is transparent or semitransparent, the second resin layer has the same color as the support layer, and the first and second resin layers cooperate to form an outer shape of the band body.

According to the present invention, there is provided a wristwatch comprising a band including a band body with a series of holes provided therein along a length thereof for adjusting an effective length thereof, and a wristwatch case provided on the band. The band body includes: a band-shaped support layer of woven or knit fabric of bundles of one or more kinds of fibers selected from a group including carbon fibers, glass fibers, aramid fibers and boron fibers; a first resin layer adhered closely to one surface of the support layer; and a second resin layer adhered closely to the other side of the support layer. The fibers of the support layer extend at a predetermined angle to longitudinal and transverse directions of the band body.

According to further aspect of the present invention, there is provided a method of making a band, comprising:

cutting out a plurality of band-shaped support layers from a large-sized sheet including a support layer of a fabric or knit formed by fabricating or knitting bundles of one or more kinds of fibers selected from a group including carbon fibers, glass fibers, aramid fibers and boron fibers so as to intersect extending directions of the bundles at 90 degrees to each other, with a longitudinal direction of each band-shaped support layer being at a predetermined angle to the extending directions of the bundles of fibers of the support layer of the large-sized sheet;

adhering a first resin layer closely to one surface of each band-shaped support layer cut out from the large-sized sheet, using a mold; and adhering a second resin layer closely to the other surface of each band-shaped support layer, using a mold.

According to further aspect of the present invention, there is provided a method of making a band, comprising:

cutting out a plurality of band-shaped support layers from a large-sized sheet including a fiber layer of a fabric or kit and a metal layer deposited on the fiber layer, the fiber layer being formed by fabricating or knitting bundles of one or more kinds of fibers selected from a group including carbon fibers, glass fibers, aramid fibers and boron fibers so as to intersect extending directions of the bundles at 90 degrees to each other, the metal layer including metal particles of aluminum alloy or nickel alloy, with a longitudinal direction of each band-shaped support layer being at a predetermined angle to the extending directions of the bundles of fibers of the large-sized sheet;

adhering a first resin layer closely to one surface of each band-shaped support layers cut out from the large-sized sheet, using a mold; and adhering a second resin layer closely to the other surface of each band-shaped support layer, using a mold.

According to the band making method of the present invention, the predetermined angle is in a range of 15-75 degrees.

According to the band making method of the present invention, the predetermined angle is 45 degrees.

According to the band making method of the present invention, the bundles of fibers of the large-sized sheet are impregnated with the same resin as that of the second resin layer.

Thus, according to the band of this invention, a band-shaped support layer includes a fabric of two groups of bundles of one or more kinds of fibers selected from the group of kinds of fibers consisting of carbon fibers, glass fibers, aramid fibers and boron fibers and woven or knit such that the selected two groups of bundles of one or more kinds of fibers extend perpendicular to each other. Further, the selected two groups of one or more kinds of fibers of the support layer extend at the predetermined angle to the longitudinal and transverse directions of the band. Thus, the fibers of the support layer are easy to extend in the longitudinal direction thereof in response to a longitudinal force applied to the support layer, thereby greatly improving the strength of the support layer against longitudinal pulling and/or twisting of the band. Thus, breakage and twisting of the band which are liable to occur during its use and separation between the first and second resin layers due to twisting of the band are prevented.

Likewise, according to the band making method of this invention, from the large sheet made of two groups of bundles of one or more kinds of fibers selected from the group of kinds of fibers consisting of carbon fibers, glass fibers, aramid fibers and boron fibers and woven or knit such that the selected two groups of bundles of one or more kinds of fibers extend perpendicular to each other, a plurality of band-shaped support layers are cut out such that the support layers extend at the predetermined angle to the extending direction of the fibers of the large sheet. Therefore, cutting out the support layers is performed rapidly and easily. In addition, the first resin layer is caused to adhere closely to one surface of the support layer using the molds and the second resin layer is also caused to adhere closely to the other surface of the support layer using the molds. Thus, a band is made having a beautiful appearance and a sense of high quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention, and together with the general description given above and the detailed description of the preferred embodiments given below, serve to explain the principles of the invention.

DETAILED DESCRIPTION OF THE INVENTION

Figure 1:
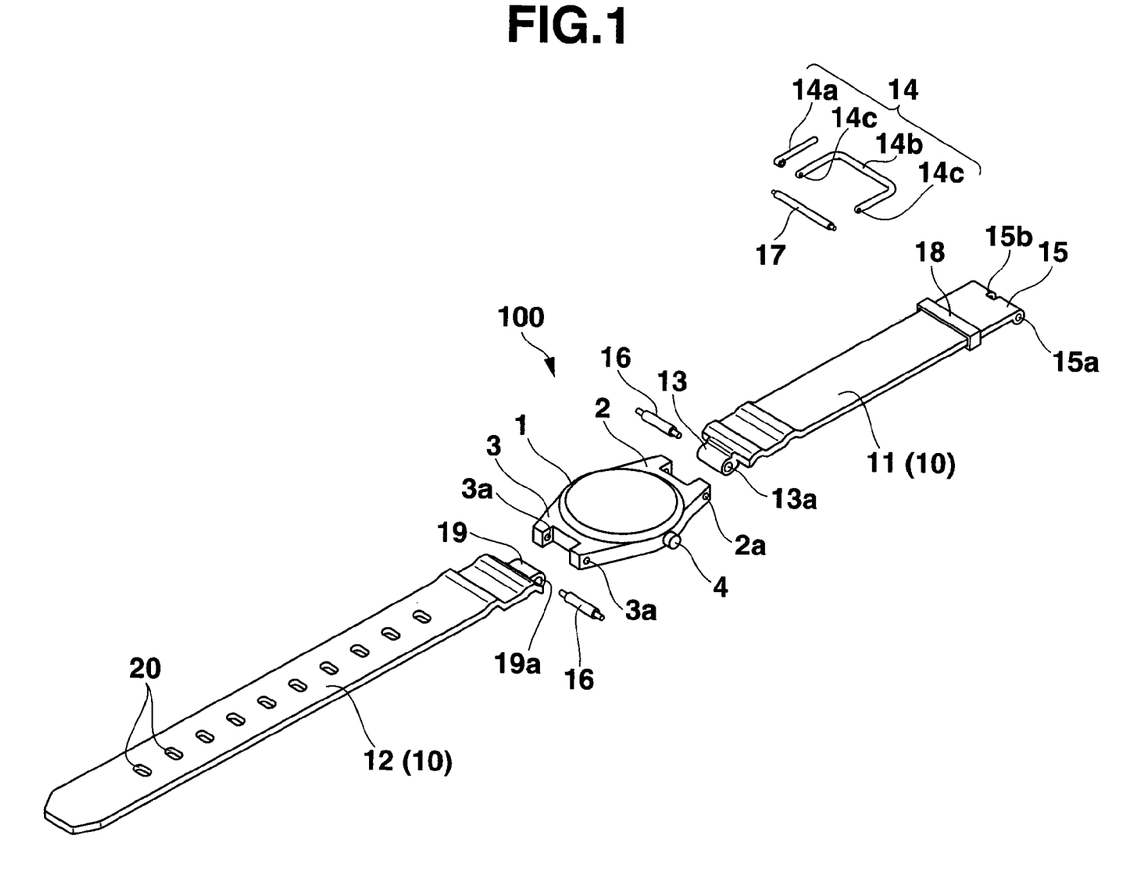
FIG. 1 is an exploded perspective view of a wristwatch with a band according to one embodiment of the present invention.

A preferred embodiment of the present invention will be described with reference to the drawings. FIG. 1 is an exploded perspective view of a wristwatch with a band according to the embodiment. The wristwatch 100 is one which displays time by rotating pointers thereof such as seconds, minute and hour hands (not shown). Of course, it may be a wristwatch with no pointers and/or a wristwatch with both pointers and a liquid crystal time indicator.

The wristwatch 100 has a case 1 with pairs of band attachment lugs 2, 3. A plurality of operation buttons 4 are provided along the outer periphery of the case 1 to give several commands including time correction although in FIG. 1 only one operation button 4 is shown.

The band 10 is connected through the pairs of lugs 2 and 3 to the case. In the embodiment the band 10 includes a first band member 11 and a second band member 12. The first band member 11 has a buckle 14 at one end. The buckle 14 is composed of a buckle clasp 14a and a buckle frame 14b. The second band member 12 has therein a series of holes 20 into a selected one of which the buckle clasp 14a is inserted to adjust the effective length of the band, thereby wearing the watch snugly around a wrist.

The first band member 11 is shorter than the second band member 12. The first band member 11 has a proximal end portion 13 for connection to an object, or more particularly the case 1. The proximal end has a through hole 13a extending transversely thereof. The first band member 11 also has a distal end 15 for connection to a buckle 14. The distal end 15 has a through hole 15a extending transversely thereof and a notch 15b provided centrally in the width thereof communicating with the through hole 15a. A spring bar 16 is inserted into the hole 13a in the proximal end 13 from the side of its one end such that the spring bar 16 appears at its either end outside the hole 13a and is then engaged at its either end in the hole 2a in the pair of lugs 2, thereby connecting the first band member 11 to the case 1.

A spring bar 17 is inserted into the through hole 15a in the distal end 15 from one end of the hole 15a, pushed so as to pass through a proximal end of the buckle clasp 14a positioned in the notch 15b, and then engaged at either end thereof in an associated one of holes 14c in the ends of the buckle frame 14b, thereby connecting the buckle 14 to the distal end 15. A second-band member retaining loop 18 is then attached to the first band member 11.

The second band member 12 has a proximal end 19 for connection to the case 1. The proximal end 19 has a through hole 19a extending transversely thereof.

Figure 2A:
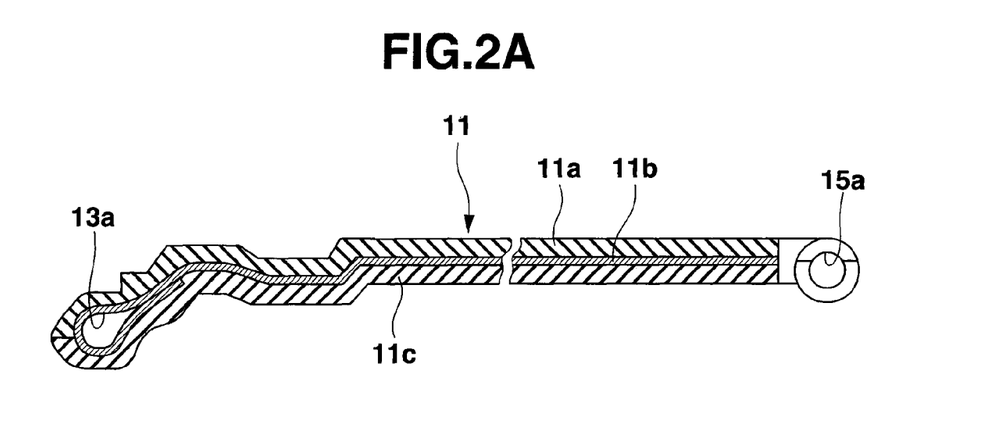
FIG. 2A is a longitudinal sectional view of a first band member of the wristwatch band of FIG. 1.
Figure 2B:
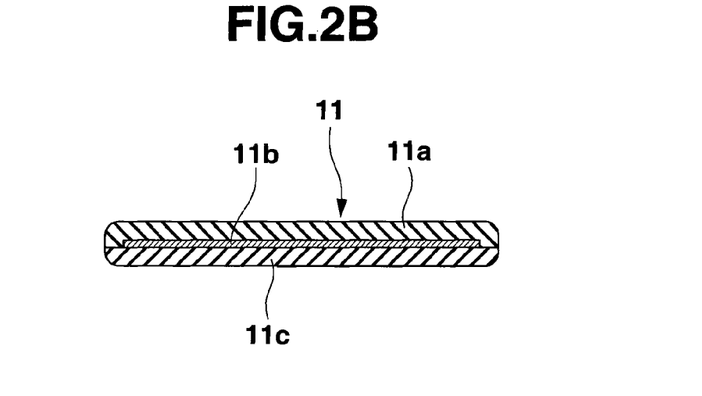
FIG. 2B is a transverse sectional view of the first band member.

Then, the materials of the first band member 11, the second band member 12 and the second-band member retaining loop 18 will be described in this order. As shown in FIGS. 2A and 2B, the first band member 11 has a 3-layered structure of a top layer, an intermediate layer and a bottom layer. FIG. 2A is a longitudinal cross-sectional view of the first band member 11. FIG. 2B is a transverse cross-sectional view of the first band member 11.

The top layer of the first band member 11 is composed of a resin layer 11a of a transparent or semitransparent material. The intermediate layer is made of a band-shaped support layer 11b of a woven or knit fabric of carbon fibers. The bottom layer is composed of a second resin layer 11c of the same color as the support layer 11b. The second resin layer 11c is made, for example, of polyurethane resin. The first and second resin layers 11a and 11c are a size larger than the support layer 11b such that the first and second resin layers 11a and 11c cover or hide the whole support layer 11b, as viewed from the side of the first resin layer 11a.

The reason why the top layer 11a is made of the transparent material is for the purpose of allowing the user to view the support layer 11b as an exterior of the first band member 11 from the outside through the top transparent layer. The reason why the top layer is made of the semitransparent material is for the purpose of allowing the user to view the support layer 11b as the exterior of the first band member from the outside through the top semitransparent layer and/or of rendering inconspicuous possible defects such as possible scratches on the surface of the top layer. In the present invention, the semitransparent materials include substantially transparent to substantially opaque materials each of which is lightly colored or not colored with a pigment or dyestuff contained in a kneaded state in that material.

Assume now that the intermediate layer 11b includes a band-shaped support layer of a fabric on which metal particles of aluminum or nickel alloy are deposited by evaporation or sputtering and that the top layer includes a semitransparent material. If in this case the color and transparency of the semitransparent material of the top layer 11a are changed variously, bands having different specific visual appearances of design are obtained.

The reason why the bottom layer 11c has the same color as the support layer 11b is for the purpose of rendering inconspicuous a possible bad appearance of the support layer 11b involving possible gaps in the fabric of and/or possible deformed ends of the support layer 11b, as viewed from the side of the first resin layer 11a. In the first band member 11, the through holes 13a and 15a at the proximal and distal ends 13 and 15 are formed by the loops provided at the respective ends of the first band member 11 to increase the strength of the proximal and distal ends 13 and 15.

Figure 3A:
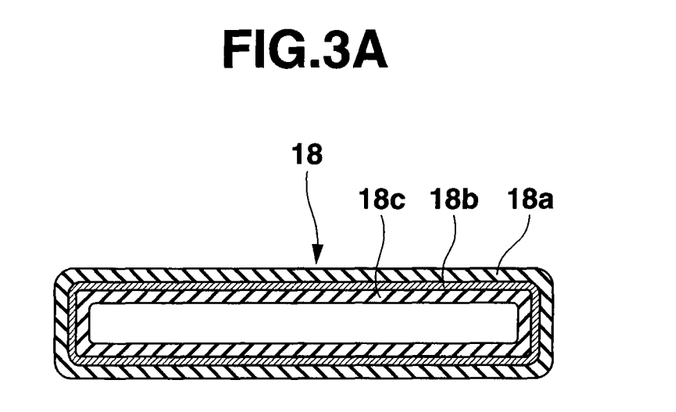
FIG. 3A is a longitudinal cross-sectional view of a band keeper in the wristwatch band of FIG. 1.
Figure 3B:
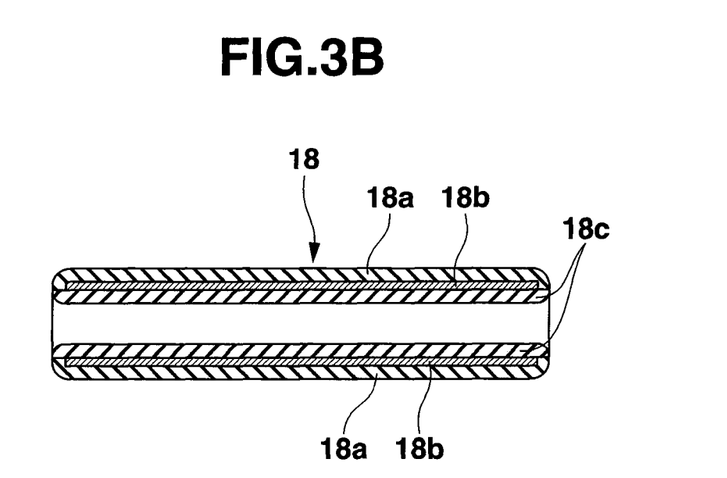
FIG. 3B is a transverse cross-sectional view of the band keeper.

As shown in FIGS. 3A and 3B, the second-band member retaining loop 18 has a 3-layered structure of a top layer, an intermediate layer and a bottom layer. FIG. 3A is a longitudinal cross-sectional view of the loop 18. FIG. 3B is a transverse cross-sectional view of the loop 18. The top layer 18a includes a first transparent resin layer 18a, for example, of polyurethane resin or a semitransparent material.

The intermediate layer includes a support layer 18b of woven or knit fabric of bundles of carbon fibers. The bottom layer includes a second resin layer 18c having the same color as the support layer 18b. The second resin layer 18c is made, for example, of polyurethane resin.

The second resin layer 18c and the first resin layer 18a are a size larger than the support layer 18b, as viewed from the side of the first resin layer 18a so as to cover the whole support layer 18b.

Like in the case of the first band member 11, the reason why the top layer 18a is made of the transparent material is for the purpose of causing the user to view the support layer 18b as an exterior of the second band member-retaining loop 18 from the outside through the top transparent layer. Likewise, the reason why the top layer is made of the semitransparent material is for the purpose of allowing the user to view the support layer 18b as the exterior of the second band member-retaining loop 18 from the outside through the top semitransparent layer and/or of rendering inconspicuous possible defects such as possible scratches on the surface of the top layer. The semitransparent materials are similar to those described above. Like in the case of the first band member 11, assume now that the intermediate layer includes a band-shaped support layer of a fabric on which metal particles of aluminum or nickel alloy are deposited by evaporation or sputtering and that the top layer is semitransparent. If in this case the color and transparency of the semitransparent material of the top layer are changed variously, bands having different specific visual appearances of design are obtained.

Like in the case of the first band member 11, the reason why the bottom layer has the same color as the support layer 18b is for the purpose of rendering inconspicuous a possible bad appearance of the support layer 18b due to possible gaps in the fabric of and/or possible deformed ends of the support layer 18b, as viewed from the side of the first resin layer 18a.

Figure 4A:
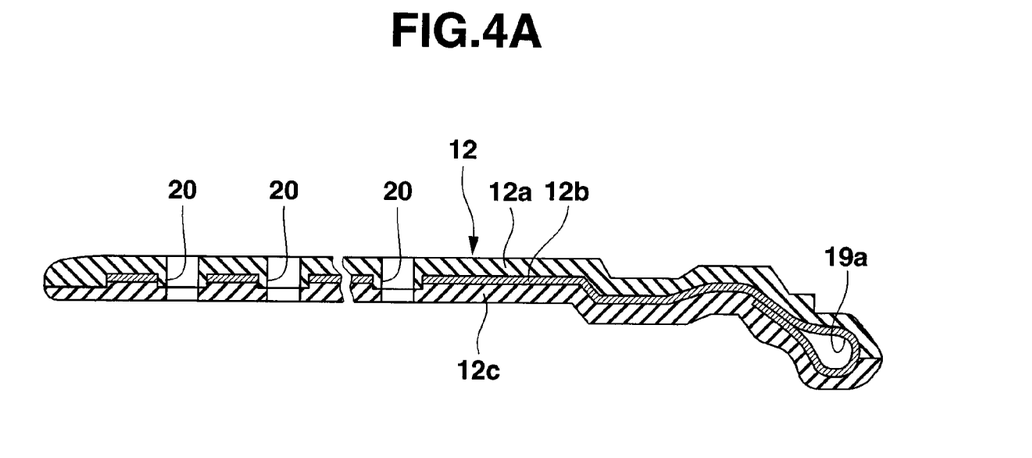
FIG. 4A is a longitudinal sectional view of a second band member of the wristwatch band of FIG. 1.
Figure 4B:
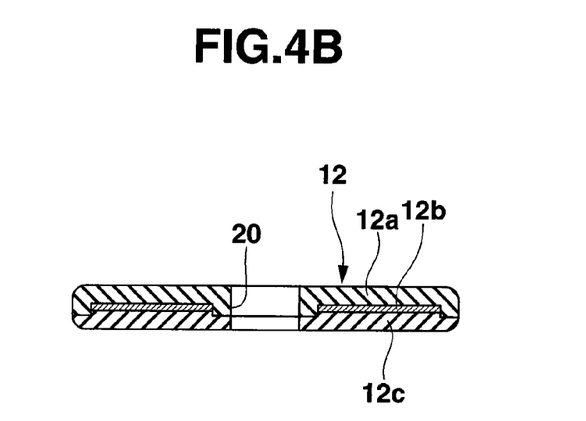
FIG. 4B is a transverse sectional view of the second band member.

As shown in FIGS. 4A and 4B, the second band member 12 has a 3-layered structure of a top layer, an intermediate layer and a bottom layer. FIG. 4A is a longitudinal cross-sectional view of the second band member 12. FIG. 4B is a transverse cross-sectional view of the second band member 12.

The top layer of the second band member 12 includes a first transparent or semitransparent resin layer 12a. The intermediate layer includes a support layer 12b of woven and knit fabric of bundles of carbon fibers. The bottom layer includes a second resin layer 12c having the same color as the support layer 12b. The second resin layer 12c is made, for example, of polyurethane resin. The second resin layer 12c is a size larger than the support layer 12b, as viewed from the side of the first resin layer 12a. The outside of the second band member 12 and the respective inner peripheries of series of holes 20 in the second band member 12 are formed by the first or second resin layer 12a or 12c such that the carbon fibers of the support layer 12b are not exposed outside.

Like in the case of the first band member 11, the reason why the top layer 12a is made of the transparent material is for the purpose of causing the user to view the support layer 12b as an exterior of the second band member 12 from the outside through the top transparent layer. Likewise, the reason why the top layer 12a is made of the semitransparent material is for the purpose of allowing the user to view the support layer 12b as the exterior of the second band member 12 from the outside through the top semitransparent layer and/or of rendering inconspicuous possible defects such as possible scratches on the surface of the top layer. The semitransparent materials are similar to those mentioned above. Like in the case of the first band member 11, assume now that the intermediate layer includes a band-shaped support layer of a fabric on which metal particles of aluminum or nickel alloy are deposited by evaporation or sputtering and that the top layer includes a semitransparent material. If in this case the color and transparency of the semitransparent material of the top layer 12a are changed variously, bands having different specific visual appearances of design are obtained.

Like in the case of the first band member 11, the reason why the bottom layer 12c has the same color as the support layer 12b is for the purpose of rendering inconspicuous a possible bad appearance of the support layer 12b due to possible gaps in the fabric of and/or possible deformed ends of the support layer 12b, as viewed from the side of the first resin layer 12a.

In the second band member 12, the support layer 12b has a loop at its end so as to form the through hole 19a in order to increase the strength of the proximal end 19 thereof.

As described above, according to this embodiment, the support layer 12b of woven or knit fabric of bundles of carbon fibers is disposed between the first and second resin layers, thereby preventing the band from being separated into the respective layers due to breakage or twist of the band.

In this band, the extending direction of the bundles of carbon fibers of the support layer 12b is at the predetermined angle to the longitudinal direction of the band. Thus, the first and second resin layers and the support layer and hence its bundles of carbon fibers follow an extension of the band and hence are easy to extend in the longitudinal direction of the band, thereby creating no separation between the support layer and each of the first and second resin layers. Thus, the strength of the band against a twist and/or pulling in the longitudinal direction of the band is greatly increased. Therefore, separation of the band into the first and second resin layers and the support layer due to the twist is prevented.

If the extending direction of the bundles of carbon fibers of the support layer 12b is parallel or substantially parallel to the longitudinal direction of the band, the first and second resin layers and the support layer follow an extension of the band in its longitudinal direction. However, the bundles of carbon fibers included in the support layer 12b do not follow the extension in the band in its longitudinal direction and hence the band would separate into the respective first and second resin layers and support layer. That is, the strength of the band against a twist and pulling in the longitudinal direction of the band is low.

However, since the extending direction of the bundles of carbon fibers of the support layer is at the predetermined angle to the longitudinal direction of the band, occurrence of a so-called "streak" along a longitudinal centerline of the band and hence its breakage at the streak are prevented in molding, thereby improving the appearance of the band.

Since the top or first resin layer 12a of the second band member 12 is transparent, the state of color and gloss of the woven or knit fabric of bundles of carbon fibers of the support layer can be securely viewed as a design through the first transparent layer from the outside. When the top or first resin layer 12a is semitransparent, the state of color and gloss of the woven or knit fabric of bundles of carbon fibers of the support layer can be securely viewed as a design through the first transparent layer from the outside, and possible defects such as possible scratches on the surface of the top layer are rendered difficult to view because these defects are rendered inconspicuous by the top layer. The semitransparent materials are similar to those described above.

Like in the case of the first band member 11, assume now that the intermediate layer includes a band-shaped support layer of a fabric on which metal particles of aluminum or nickel alloy are deposited by evaporation or sputtering and that the top layer includes a semitransparent material. If in this case the color and transparency of the semitransparent material of the top layer are changed variously, bands having different specific visual appearances of design are obtained.

Figure 2C:
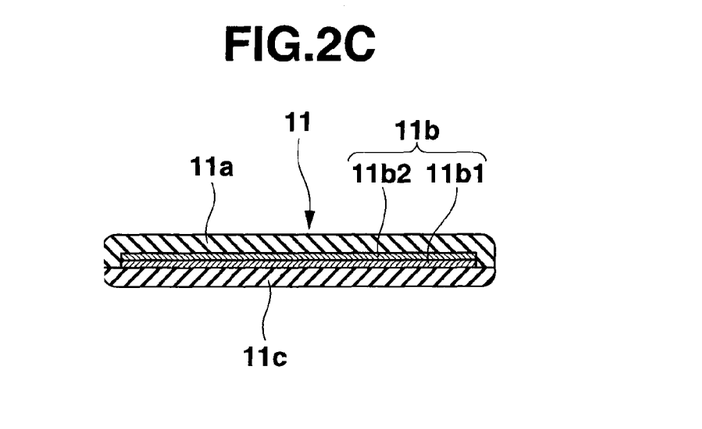
FIG. 2C is a transverse sectional view of the first band member whose intermediate layer is made of a fiber layer of woven or knit fabric and a metal layer of its surface.

For example, as shown in FIG. 2C, the first band member 11 may include an intermediate or support layer 11b which consists of a fiber layer 11b1 of a woven or knit fabric of bundles of fibers of one or more kinds selected from the group consisting of carbon fibers, glass fibers, aramid fibers and boron fibers; and a metal layer 11b2 of metal particles such as aluminum or nickel alloy deposited on the fiber layer 11b1, in addition to the first and second resin layers 11a and 11c adhering to the opposite sides of the intermediate layer 11b.

When the bottom layer 12c has the same color (for example, black) as the support layer, possible distorted and/or deformed edges and possible unevenness in the fabric of the support layer are rendered inconspicuous. Thus, the bands are suitable for mass production.

Since the support layer has the through hole 13a or 15a formed by looping itself at one end thereof for receiving the spring bar, so-called "breakage" of the band at the through hole is prevented.

Figure 5:
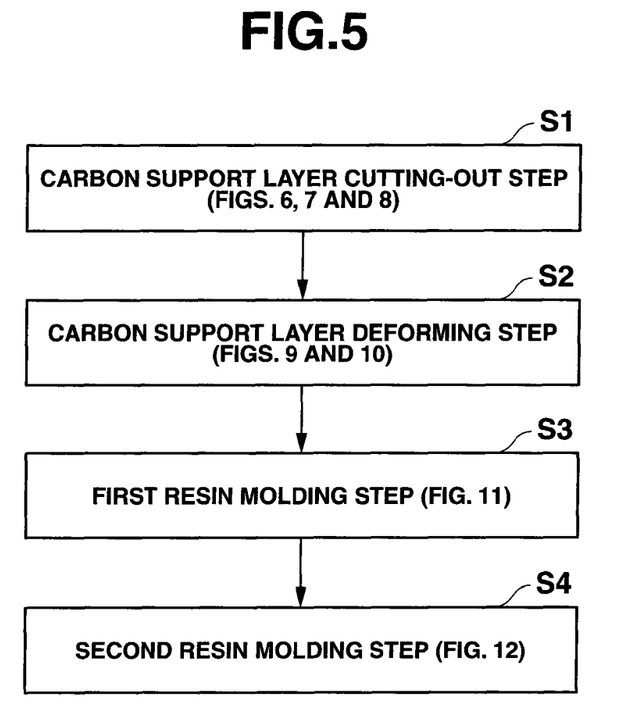
FIG. 5 shows a series of steps of a method for making the wristwatch band of FIG. 1.

Then, one example of a method of making the wristband 100 will be described. As shown in FIG. 5, this method includes a support layer cutting-out step (step 1), a support layer deforming step (step 2), a first resin molding step (step 3), and a second resin molding step (step 4), which will be described sequentially.

[Band-Shaped Support Layer Cutting-Out Step]

Figure 6A:
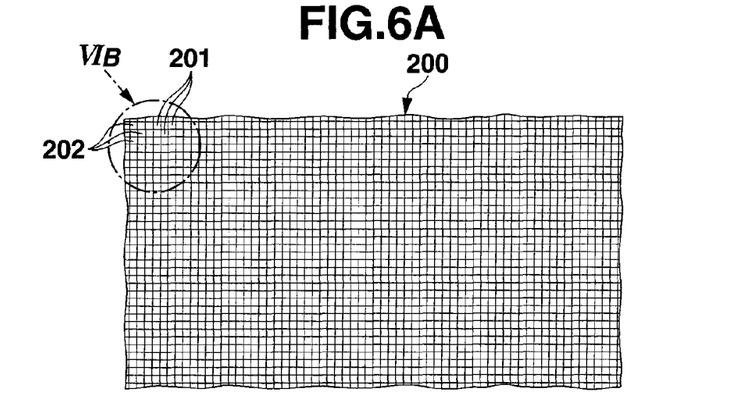
FIG. 6A is a plan view of a part of a large-sized sheet prepared in the method for making the wristwatch band of FIG. 5.
Figure 6B:
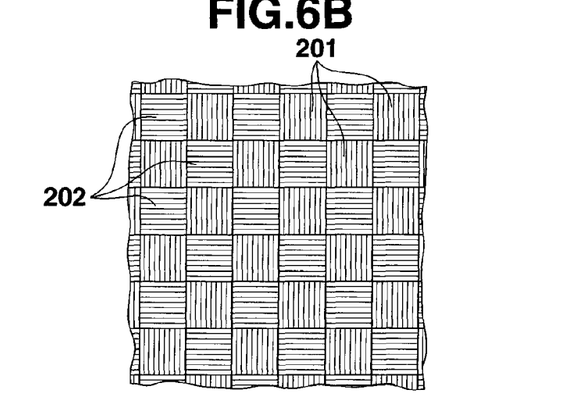
FIG. 6B is an enlarged view of a part of the large-sized sheet.
Figure 7:
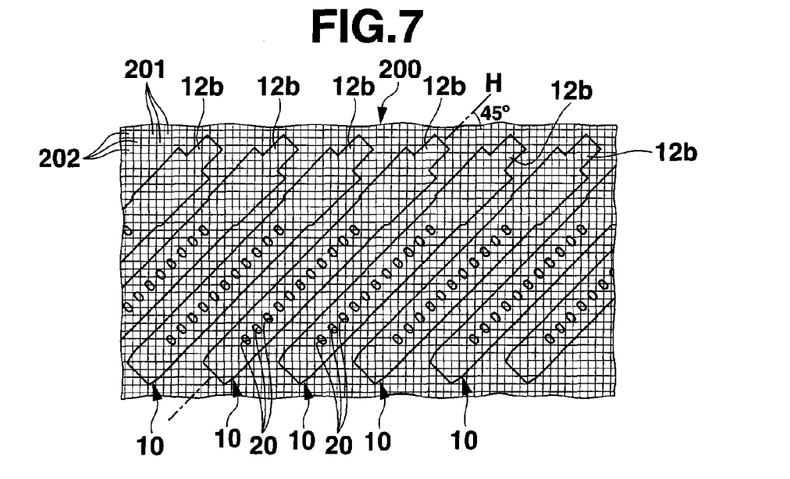
FIG. 7 is a plan view of a part of the large-sized sheet in a support layer cutting-out step of FIG. 5.

The band-shaped support layer cutting-out step (step 1) includes cutting or stamping out a plurality of support layers from a prepared large carbon sheet. FIG. 6A is a plan view of the sheet specifically and FIG. 6B is an enlarged view of part of the sheet of FIG. 6A. FIG. 7 specifically illustrates a step for stamping out a plurality of support layers each for a corresponding band member 12 from the sheet 200.

First, as shown in FIGS. 6A and 6B, the prepared large square sheet 200 is of a woven or knit fabric of bundles of carbon fibers intersecting at 90 degrees. Each bundle is composed, for example, of 1000 carbon fibers having a diameter of 7 μm. Alternatively, the materials of the fabric may be glass fiber, aramid fiber or boron fiber. That is, a fabric may be used which is woven or knit with bundles of fibers of one or more kinds.

In this embodiment, the sheet 200 has a size large enough to stamp out either a large number of support layers each for a corresponding first band member 11 or a large number of support layers each for a corresponding second band member 12 therefrom.

The size of the sheet is also large enough or stamp out, in a mixed manner, both a large number of support layers each for a corresponding first band member 11 and a large number of support layers each for a corresponding second band member 12 therefrom.

The woven or knit fabric of bundles of carbon fibers of the large sheet 200 are beforehand impregnated with the same resin component as contained in the first and second resin layers 11a, 12a, 18a and 11c, 12c, 18c to ensure a high interfacial affinity between a support layer 12b cut out from the sheet 200 and each of the first and second resin layers. Alternatively, a composite of the large sheet 200 and a film of the same resin material as the first and second resin layers attached to at least one of the opposite surfaces of the large sheet 200 may be used to cut out support layers therefrom. Further alternatively, in the last-mentioned case, the bundles of fibers included in the large sheet 200 may be beforehand impregnated with the same resin as the first and second resin layers.

As shown in FIG. 7, a large number of support layers 12b each for a corresponding second band member 12 are stamped out from the large sheet 200 in a state in which the longitudinal direction H of each support layer 12b is at a predetermined angle of 45 degrees to the extending directions of the bundles of vertical and horizontal carbon fibers 201 and 202 of the sheet 200. The series of holes 20 for the buckle clasp in each support layer 12b is formed by stamping methods simultaneously with or at a different time when that support layer is stamped out.

Figure 8:
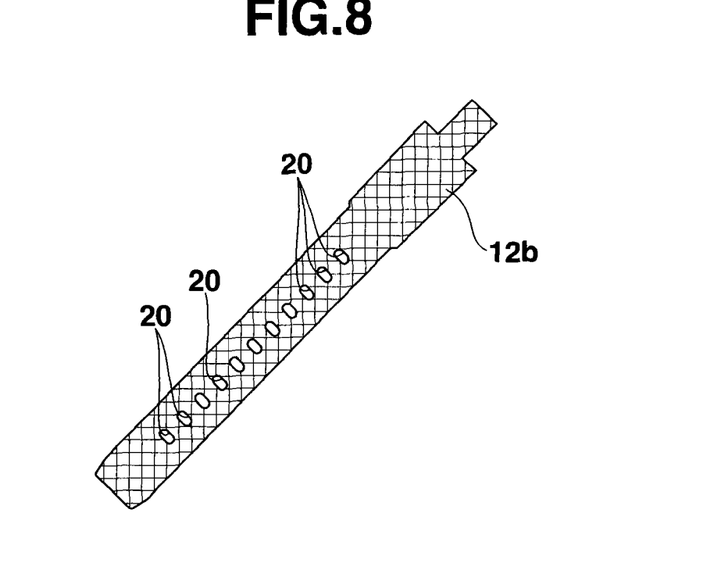
FIG. 8 is a plan view of a second support layer cut out in the support layer cutting-out step of FIG. 7.

FIG. 8 illustrates one example of the support layers 12b obtained in the stamping step. Similarly, a large number of support layers 12b each for a corresponding first band member 11 and a large number of support layers 18b each for a loop 18 are stamped out. If possible, one or more support layers 18b each for a corresponding loop 18 are preferably stamped out from the remainder of the large sheet 200 from which the support layers 11b and 12b for the first and second band members 11 and 12 have been stamped out.

[Band-Shaped Support Layer Deforming Step]

Figure 9:
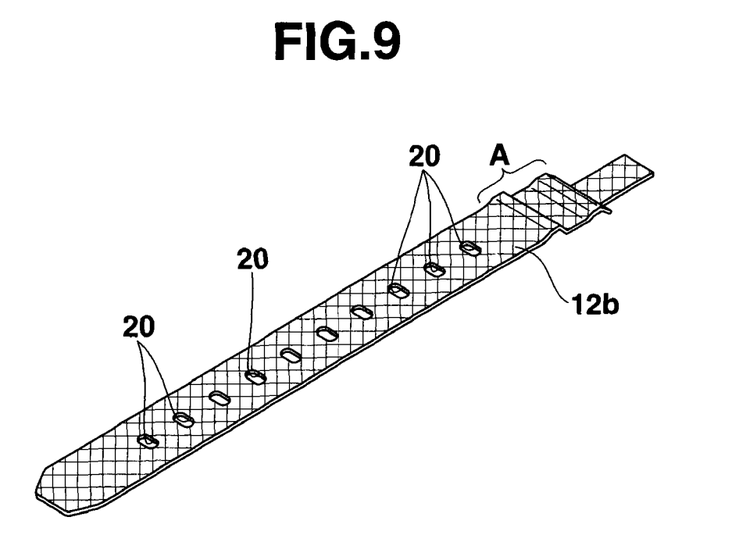
FIG. 9 is a perspective view of the second support layer after finishing of corrugation forming in a support layer deforming step of FIG. 5.
Figure 10:
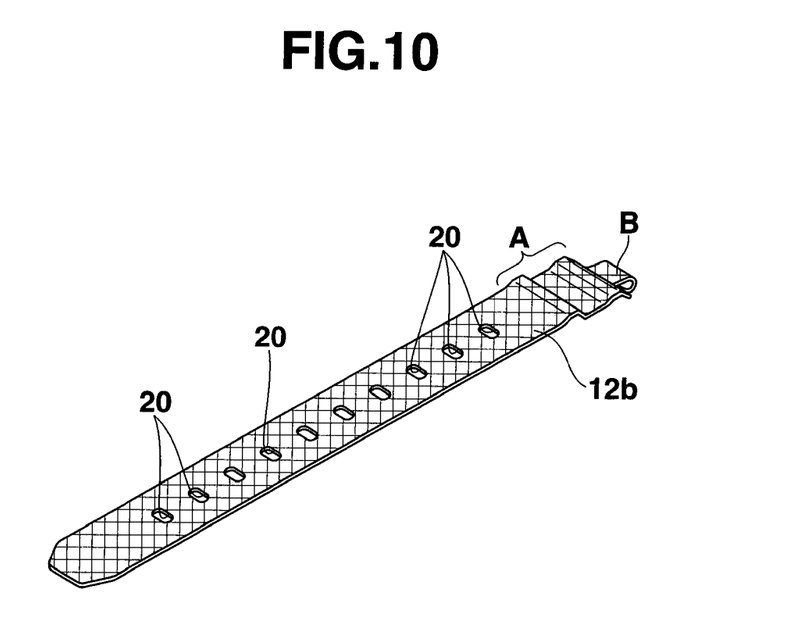
FIG. 10 is a perspective view of the second support layer after finishing of loop forming in the support layer deforming step of FIG. 5.

The band-shaped support layer deforming step will be described next. As shown in FIGS. 9 and 10, the step includes deforming the stamped out support layers 11b and 12b, including a loop forming step. A corrugation-forming step is performed on each of the support layers 11b and 12b as required.

FIGS. 9 and 10 respectively illustrate a second-band support layer 12b with a corrugated part A near its proximal end and a different second-band support layer 12b with a looped end B formed after the formation of the corrugated part A. After forming the loop end, overlapping parts of the second-band support layer 12b cooperated to form the loop are preferably press-adhered to each other to avoid collapse of the loop shape.

Similarly, a corrugated part and a loop are formed at a proximal end of a support layer 12b for each first band member support layer 11b. After the loop is formed, overlapping parts of the second-band support layer 12b cooperated to form the loop are preferably press-adhered to each other to avoid collapse of the loop form. Each support layer 18b for the second-band retaining loop 18 is then looped so as to form this retaining loop 18. After this loop is formed, overlapping parts of the second-band retaining loop support layer 18b cooperated to form the loop 18 are preferably press-adhered to each other to avoid collapse of the loop form.

[First and Second Resin Molding Steps . . . Insert Molding]

Figure 11:
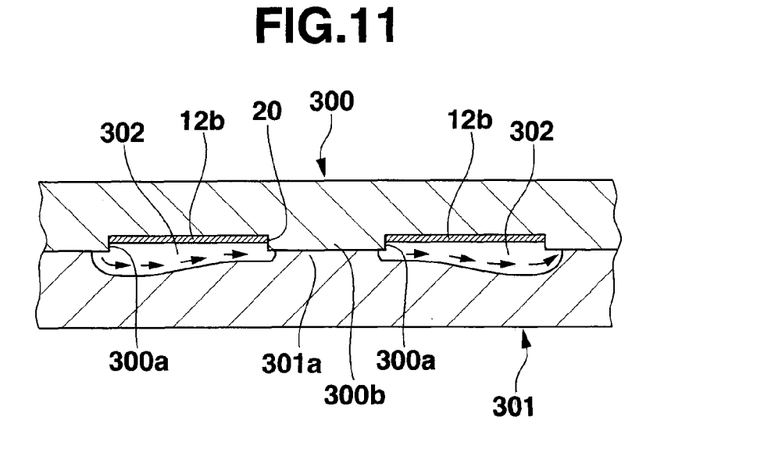
FIG. 11 is a cross sectional view of a mold, which is used for explaining a first resin molding step of FIG. 5 to be performed on for example the second band member.
Figure 12:
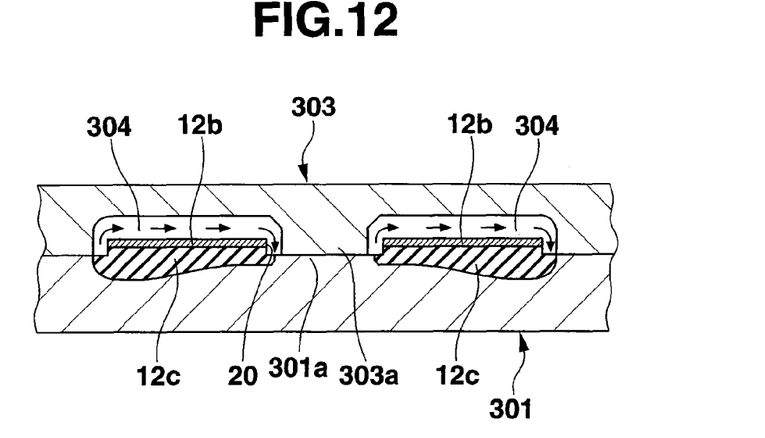
FIG. 12 is a cross sectional view of a mold, which is used for explaining a second resin molding step of FIG. 5 to be performed on for example the second band member.
Figure 13:
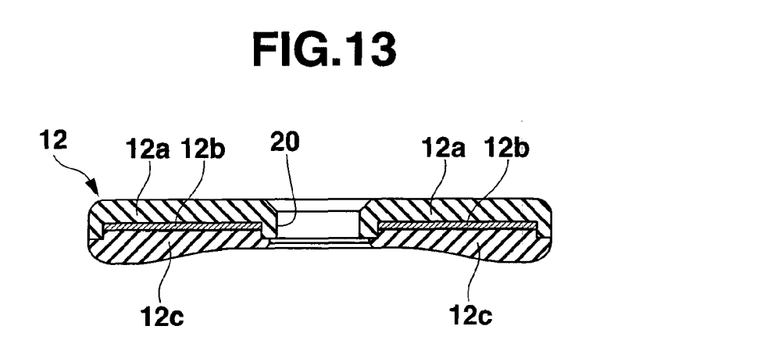
FIG. 13 is a cross sectional view of the second band member obtained in the first and second resin moldings.

FIGS. 11-13 specifically illustrate the first and second resin molding steps for forming the second band member 12. As shown in FIGS. 11 and 12, the first resin molding step includes providing a second resin layer 12c of the same color as the support layer 12b on its lower side to compose a corresponding second band member 12, using an upper fixed mold 300 and a lower movable mold 301.

As shown in FIG. 12, the second resin molding step includes providing a first transparent or substantially transparent resin layer 12a on the upper side of the support layer 12b, using the lower movable mold 301 and another upper fixed mold 303. The sequence of performing the first and second resin molding steps may be reversed.

FIGS. 11-13 illustrate specified first and second resin molding processes for the second band 12 and specifically illustrates a process of forming, by molding, holes 20 in the band where the buckle clasp is inserted to adjust the effective length of the band.

First, the first resin molding step will be described. As shown in FIG. 11, each second-band support layer 12b is disposed within a recess 300a of the upper mold 300, and each of projections 301a of the movable mold 301 is disposed in a corresponding one of the series of holes 20 in abutting and aligning relationship with a corresponding one of projections 300b of the fixed mold 300 to form a corresponding final one of the holes 20 at that position. Then, the fixed and movable molds 300 and 301 are secured together. Then, a melted thermoplastic resin, for example, of polyurethane is charged into cavities 302 within the fixed and movable molds 300 and 301, thereby forming a second resin layer 12c under the second-band support layer 12b. At this time, the second-band support layer 12b is moved from the fixed mold 300 and then sticks to the second resin layer 12c. Then, the second resin layer 12c is cured.

Then, the second resin molding step will be described. As shown in FIG. 12, the movable mold 301 is separated from the fixed mold 300 with the second-band support layer 12b and the underlying second resin layer 12c received within the movable mold 301. Then, the movable mold 301 with the support layer 12b and the underlying second resin layer 12c received therein is secured together with another fixed mold 303 with its protrusions 303a at positions corresponding to those of the holes 20 in the second-band support layer 12b disposed in abutting relationship with the projection 301a of the movable mold 301.

Then, a melted thermoplastic resin, for example, of polyurethane is introduced into a cavity 304 formed by the fixed and movable molds 300 and 301 to form a first resin layer 12a on an upper surface of the second-band support layer 12b. This support layer 12b also adheres to the first resin layer 12a. Then, the first resin layer 12 is cured. One example of the second band member 12 obtained in the first and second resin molding steps is illustrated in FIG. 13. Similarly, a first band member 11 and a second band member-retaining loop 18 are molded. In order to mold the loop 18, a jig which delimits a cavity for the loop in a mold is needed. After molding of the loop 18, the jig is removed from the loop 18.

Figure 14:
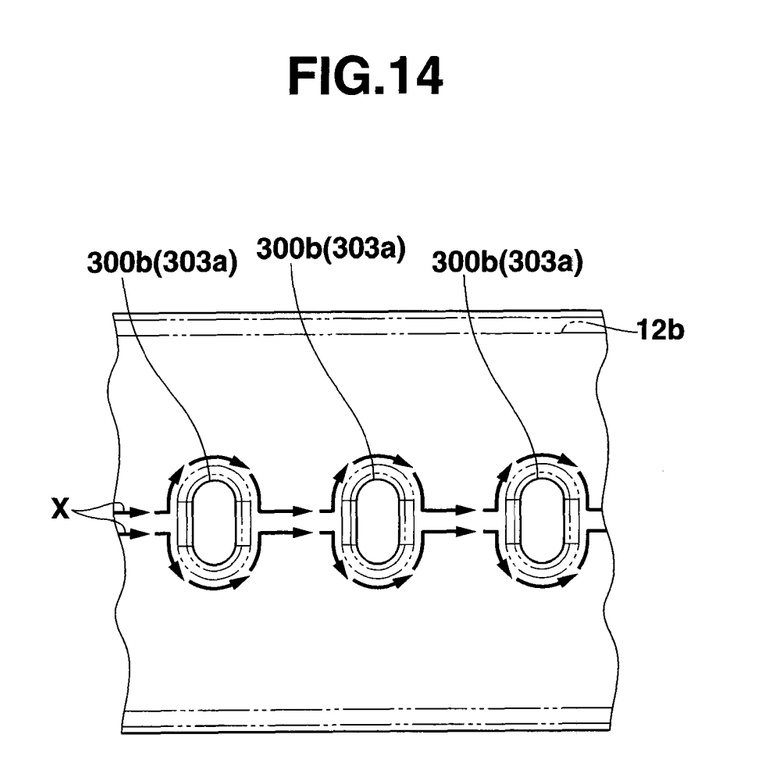
FIG. 14 is a view used for explaining a flow of resin in the mold when the second band member is molded.

In each of the first and second resin molding steps, the melted resin is generally charged, as shown by X in FIG. 14, so as to flow from the side of one end (for example, a left end in FIG. 14) of the second-band support layer 12b toward its other end (for example, a right end in FIG. 14). At this time, the charged melted resin hits the outer front of each of projections 300b or 300a of the fixed mold 300 or 303, separates into two flows along the outer periphery of that projection and then these flows merge at the outer back of the projection.

This operation is repeated each time the melted resin hits a respective one of the series of the projections 300b or 300a arranged from left to right within the molds shown in FIG. 14 as the resin flows from left to right within the molds.

In this case, assume that the extending directions of the bundles of carbon fibers of the second-band support layer 12b are parallel or otherwise perpendicular, or not inclined, to the longitudinal and transverse directions of the second-band support layer 12b. In this case, in molding, a weak "weld line" can be produced on a formed first or second resin layer along a line connecting the centers of adjacent holes 20 in a resulting support layer by confluence of the two separated flows of plastic resin which have flowed around an associated projection 303a or 303b of the molds between that projection 303a or 303b and a next adjacent projection 303a or 303b. This weld line can extend parallel to, and through a gap between, adjacent straight bundles of carbon fibers of the woven or knit fabric where the gap is divided by a multiplicity of other parallel bundles of carbon fibers of the fabric, perpendicular to those adjacent bundles of straight carbon fibers, into a corresponding number of smaller cellular gaps. In this case, a resulting band would be liable to be broken at the weld line during use thereof.

However, in the embodiment the extending direction of the bundles of carbon fibers of the support layer 12b is at the predetermined angle, for example of 45 degrees, to the longitudinal and transverse directions of the support layer 12b. Thus, a situation does not occur in which when the band 12 is pulled in its longitudinal direction, only the first and second resin layers 12a and 12c each made of a thermoplastic resin, for example of polyurethane resin, are extended in the longitudinal direction thereof, and in which the support layer 12b of bundles of carbon fibers do not extend in the longitudinal direction of the first and second resin layers 12a and 12c. Instead, the support layer 12b of bundles of carbon fibers extending at the predetermined angle (for example of 45 degrees) and the first and second resin layers 12a and 12c together can extend to the same extent in the longitudinal direction thereof. Therefore, a situation is also prevented from occurring in which the first and second resin layers 12a and 12c are separated from the support layer 12b with a strange sound.

Even when a weld line is created on the second resin layer 12c due to confluence of the melted resins in the molding, as mentioned above, occurrence of a so-called "breakage" extending between adjacent holes 20 in the second resin layer 12c along a line connecting the adjacent holes 20 during use of a resulting band is prevented.

According to the band making method of this embodiment, a plurality of support layers are stamped out simultaneously from a prepared large carbon fiber sheet where the extending directions of the vertical and horizontal carbon fibers intersect at 90 degrees in such a manner that the longitudinal direction of each support layer is at a predetermined angle to the extending directions of the carbon fibers of the fiber sheet. Thus, such support layers can be made rapidly and easily.

According to the band making method of this embodiment, then a first resin layer is adhered closely to one surface of the support layer with molds and a second resin layer adhered closely to the other surface of the support layer with molds. Thus, a band with a beautiful appearance and a sense of high class is provided.

As described above, according to this embodiment, the band comprises the thin flat strip-like body (FIG. 1, 10) with the series of holes (FIG. 1, 20) provided therein along the length thereof for adjusting the effective length thereof, the band body (10) comprising: the support layer (FIG. 2, 11b; FIG. 4, 12b), for the band, of woven or knit fabric of bundles of carbon fibers; the first resin layer (FIG. 2, 11a; FIG. 4, 12a) adhered closely to one surface of the support layer; the second resin layer (FIG. 2, 11c; FIG. 4, 12c) adhered closely to the other side of the support layer; the fibers of the support layer extending at the predetermined angle to the longitudinal and transverse directions of the strip-like body (FIG. 7).

Specifically, the predetermined angle is in the range of 15-75 degrees.

Alternatively, the predetermined angle may be 45 degrees.

In the band of this embodiment, the support layer has the through hole (FIG. 1, 13a; 15a; 19a) at one end thereof in which hole the spring bar is received so as to connect the band to an object (1) over the spring bar, the width of that end of the support layer being somewhat narrower than the width of the band body. The first resin layer (FIG. 2, 11a; FIG. 4, 12a) is transparent or semitransparent, and the second resin layer (FIG. 2, 11c; FIG. 4, 12c) has the same color as the support layer, the first and second resin layers cooperating to form the outer shape of the band.

According to this embodiment, the wristwatch comprises: the band; and the wristwatch case (1) provided on the band. The band comprises the support layer (11b in FIG. 2; 12b in FIG. 4), for the band, of woven or knit fabric of bundles of carbon fibers; the first resin layer (11a in FIG. 2; 12a in FIG. 4) adhered closely to one surface of the support layer; the second resin layer (11c in FIG. 2; 12c in FIG. 4) adhered closely to the other side of the support layer; the bundles of fibers of the support layer extending at the predetermined angle to the longitudinal and transverse directions of the strip-like body (FIG. 7).

According to this embodiment, the method of making a band comprises: cutting out the plurality of support layers (12b in FIG. 7) for the band from the large-sized sheet (200 in FIG. 6), including the fabric of bundles of fibers knitted or woven so as to intersect at 90 degrees to each other, in such a manner that the support layers extend at a predetermined angle to the extending direction of the bundles of fibers thereof (S1 in FIG. 5; FIGS. 6-8); adhering a first resin layer closely to one side of each of the cut-out plurality of support layers, using the mold (S3 in FIG. 5; FIG. 11); and adhering a second resin layer closely to the other side of that support layer, using the second mold (S4 in FIG. 5; FIG. 12).

The method of making the band of this embodiment includes cutting out the plurality of support layers from the large sheet in such a manner that the support layers extend at 45 degrees to the extending direction of the bundles of carbon fibers of the sheet.

In the method of making the band of this embodiment, (1) the bundles of carbon fibers of the sheet may be beforehand impregnated with the same resin as contained in the first and second resin layers; (2) the large sheet may be replaced with the composite of the large sheet such as shown by 200 and the film of the same resin material as the first and second resin layers attached closely to at least one of the opposite surfaces of the sheet; and (3) the large sheet may be replaced with the composite of the large sheet such as shown by 200 impregnated beforehand with the same resin as the first and second resin layers, and the film of the same resin as the first and second resin layers attached closely to at least one of the opposite surfaces of the large sheet.

In this embodiment, the large size sheet 200 is in the form of a rectangle where the bundles of carbon fibers of the sheet extend parallel to the vertical and horizontal sides of the rectangle. Thus, the bundles of carbon fibers extend so as to intersect at 90 degrees. The support layers are stamped out from the sheet 200 in such a manner that the respective support layers extend at the angle of 45 degrees to the extending direction of the bundles of fibers included in the sheet 200.

In the case of another large sized rectangular sheet 200 where the bundles of vertical and horizontal carbon fibers intersect at 90 degrees and extend at the angle of 45 degrees to the vertical or horizontal side of the sheet 200, many support layers may be stamped out from the sheet in such a manner that the support layers extend parallel to the vertical or horizontal side of the sheet.

Although in this embodiment the support layers are illustrated as stamped out from the sheet in such a manner that they extend at the angle of 45 degrees to the extending direction of the bundles of fibers thereof, they may be stamped out at another angle such as 43 or 30 degrees to the extending direction of the bundles of fibers thereof.

It is preferable that the angle at which the support layer is stamped out to the extending direction of the bundles of fibers thereof is in the range of 15-75 degrees. If the angle is smaller than 15 degrees and larger than 75 degrees, the first and second resin layers extend in response to a force which extends the band in its longitudinal direction, but the bundles of carbon fibers of the support layer do not follow the force. Therefore, the support layer would be separated from the respective first and second resin layers. Thus, the strength of the band cannot be increased against a twist and/or pulling in its longitudinal direction. Also, in this range of angles, a weak "weld line" produced by confluence of the two separated flows of resin between every adjacent projections 303*a* or 303*b* of the molds on a formed first or second resin layer on a line connecting the centers of every resulting adjacent holes 20 in the band can coincide with a gap produced between adjacent bundles of straight carbon fibers of the woven or knit fabric with the gap being divided by a multiplicity of other parallel bundles of carbon fibers of the fabric, perpendicular to those adjacent bundles of straight carbon fibers, into a corresponding number of cellular gaps. Thus, a resulting band is liable to be broken at the weld line during use thereof.

Although in this embodiment the materials of the support member are illustrated as including the woven or knit fabric of bundles of carbon fibers, the present invention is not limited to this particular case. The support member may be made of a woven or knit fabric of bundles of one or more kinds of fibers selected from the group of kinds of fibers consisting of glass fibers, aramid fibers and boron fibers with the bundles of one or more types of fibers intersecting each other at right angles. Alternatively, it may be a composite of such fabric and metal particles of aluminum or nickel alloy deposited by evaporation or sputtering on the fabric.

Although in this embodiment the invention is illustrated as being applied to the wristwatch band, the present invention may be applicable to various bands such as dress bands and arm bands.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A band comprising:
   a band body with a series of holes provided therein along a length thereof for adjusting an effective length thereof, wherein the band body comprises:
   a band-shaped support layer of woven or knit fabric of bundles of one or more kinds of fibers selected from a group including carbon fibers, glass fibers, aramid fibers and boron fibers, and the support layer including a first side surface and a second side surface;
   a first resin layer adhered closely to the first side surface of the support layer; and
   a second resin layer adhered closely to the second side surface of the support layer,
   wherein the fibers of the support layer extend at a predetermined angle to longitudinal and transverse directions of the band body so that the support layer together with the first and second resin layers follows an extension of the band body.

2. A band comprising:
   a band body with a series of holes provided therein along a length thereof for adjusting an effective length thereof, wherein the band body comprises:
   a band-shaped support layer including a first side surface and a second side surface, and comprising (i) a fiber layer of woven or knit fabric of bundles of one or more kinds of fibers selected from a group including carbon fibers, glass fibers and aramid fibers, the fiber layer including a first side surface and a second side surface corresponding to the first side surface and the second side surface of the support layer, and (ii) a metal layer of metal particles including aluminum alloy or nickel alloy and deposited on the first side surface of the fiber layer;
   a first resin layer adhered closely to the first side surface of the support layer; and
   a second resin layer adhered closely to the second side surface of the support layer,
   wherein the fibers of the support layer extend at a predetermined angle to longitudinal and transverse directions of the band body so that the support layer together with the first and second resin layers follows an extension of the band body.

3. The band according to claim 1, wherein the predetermined angle is in a range of 15-75 degrees.

4. The band according to claim 1, wherein the predetermined angle is 45 degrees.

5. The band according to claim 1, wherein:
   the support layer includes one end in the longitudinal direction and another part excluding the one end, and has a loop at the one end thereof, the loop forming a spring-bar hole to be connected to an object to which the band is connected,
   a width of the one end is narrower than a width of said another part,
   the first resin layer is transparent or semitransparent,
   the second resin layer has a same color as the support layer, and
   the first and second resin layers cooperate to form an outer shape of the band body.

6. A wristwatch comprising:
   a band including a band body with a series of holes provided therein along a length thereof for adjusting an effective length thereof; and
   a wristwatch case provided on the band,
   wherein the band body includes:
   a band-shaped support layer of woven or knit fabric of bundles of one or more kinds of fibers selected from a group including carbon fibers, glass fibers, aramid fibers and boron fibers, and the support layer including a first side surface and a second side surface;
   a first resin layer adhered closely to the first side surface of the support layer; and a second resin layer adhered closely to the second side surface of the support layer, wherein the fibers of the support layer extend at a predetermined angle to longitudinal and transverse directions of the band body so that the support layer together with the first and second resin layers follows an extension of the band body.

\* \* \* \* \*